United States Patent
Lim

(10) Patent No.: US 6,349,224 B1
(45) Date of Patent: Feb. 19, 2002

(54) METHOD FOR MAKING MOBILE-TO-MOBILE WIRELESS DATA COMMUNICATION

(75) Inventor: Byung Keun Lim, Kyungki-do (KR)

(73) Assignee: LG Information & Communications, Ltd., Seoul (KR)

( * ) Notice: Subject to any disclaimer, the term of this patent is extended or adjusted under 35 U.S.C. 154(b) by 0 days.

(21) Appl. No.: 09/176,199

(22) Filed: Oct. 21, 1998

(30) Foreign Application Priority Data

Jan. 23, 1998 (KR) .............................. 98-2107

(51) Int. Cl.$^7$ ................................ H04Q 7/20
(52) U.S. Cl. ...................... 455/575; 455/428; 455/466; 455/556; 455/557; 455/567
(58) Field of Search .................... 455/422, 428, 455/445, 557, 560, 575, 415, 424, 425, 426, 450, 461, 462, 466, 556, 567; 370/401, 349, 338, 332, 466, 467, 469

(56) References Cited

U.S. PATENT DOCUMENTS

| | | | |
|---|---|---|---|
| 5,479,480 A | * 12/1995 | Scott ........................... 379/59 |
| 5,570,367 A | * 10/1996 | Ayanoglu et al. .......... 370/94.1 |
| 5,574,773 A | * 11/1996 | Grob et al. ..................... 379/59 |
| 5,590,133 A | * 12/1996 | Billstrom et al. ........... 370/349 |
| 5,845,211 A | * 12/1998 | Roach, Jr. ................... 455/436 |
| 5,845,215 A | * 12/1998 | Henry et al. ................ 455/553 |
| 5,854,210 A | * 12/1998 | Moon ........................ 455/426 |
| 5,884,103 A | * 3/1999 | Terbo et al. ................. 395/892 |
| 5,903,877 A | * 5/1999 | Berkowitz et al. ............ 705/26 |
| 5,970,059 A | * 10/1999 | Ahopelto et al. ........... 370/338 |
| 5,978,386 A | * 11/1999 | Hamalainen et al. ....... 370/466 |
| 5,983,090 A | * 11/1999 | Aoki ........................... 455/403 |
| 6,009,088 A | * 12/1999 | Taguchi et al. ............. 370/338 |
| 6,038,224 A | * 3/2000 | Kim et al. .................. 370/342 |
| 6,047,194 A | * 4/2000 | Andersson .................. 455/466 |
| 6,122,498 A | * 9/2000 | Sipila ......................... 455/403 |
| H1880 H | * 10/2000 | Vines et al. ................ 370/310 |
| 6,128,509 A | * 10/2000 | Veijila et al. ............... 455/556 |
| 6,137,789 A | * 10/2000 | Honkasalo .................. 370/342 |
| 6,167,270 A | * 12/2000 | Rezaiifar et al. ........... 455/442 |
| 6,230,012 B1 | * 5/2001 | Willkie et al. .............. 455/437 |

\* cited by examiner

*Primary Examiner*—Thanh Cong Le
*Assistant Examiner*—Yemane Woldetatios
(74) *Attorney, Agent, or Firm*—Fleshner & Kim, LLP (57) ABSTRACT

Method for making a mobile-to-mobile wireless data communication in PCS (Personal Communication Services)/digital cellular mobile telecommunication system, is disclosed, which allows a direct communication without occupying an IWU, the method including the steps of (1) transmitting an originating instruction for a terminating mobile data terminal as an originating mobile data terminal sets up a service mode, (2) making a communication using a first radio link protocol (RLP) set up between the originating mobile data terminal and a base station/mobile switching center, (3) calling the terminating mobile data terminal through an identification number of the originating mobile data terminal and a service option as the originating instruction is executed, (4) informing a signal responding to the call to the originating mobile data terminal, (5) making a communication using a second RLP set up between the terminating mobile data terminal and the base station/mobile switching center, (6) setting up protocol layers in succession, the protocol layers having levels higher than levels of the first, and second RLP's, and (7) executing a wireless data communication between the originating, and terminating mobile data terminals.

26 Claims, 6 Drawing Sheets

METHOD FOR MAKING MOBILE-TO-MOBILE WIRELESS DATA COMMUNICATION

BACKGROUND OF THE INVENTION

1. Field of the Invention

The present invention relates to a method for making a mobile-to-mobile wireless data communication, and more particularly, to a method for making a mobile-to-mobile wireless data communication in PCS(Personal Communication Services)/digital cellular mobile telecommunication system.

2. Background of the Related Art

Data communication between a mobile data terminal having a mobile terminal, such as a mobile phone and a data terminal such as a mini-computer connected together, and a wire data communication network, such as a PSTN(Public Switched Telephone Network), has been done using IWU (Interworking Unit). And, data communication between the mobile data terminals within a wireless mobile communication network is also done using the IWU. The IWU interconnects various independent communication networks to extend an overall communication range, for providing services that can not be provided by the independent networks. That is, the IWU serves to match protocols between wire data communication networks such as PSTN's and/or wireless data terminals connected to the wire data communication networks. For example, the IWU allows an E-mail or internet by means of a mobile terminal such as a mobile phone connected to a portable mini-computer, or communication between an acoustic coupled terminal connected to a mobile phone and a computer in a packet switching network.

Figure 1:
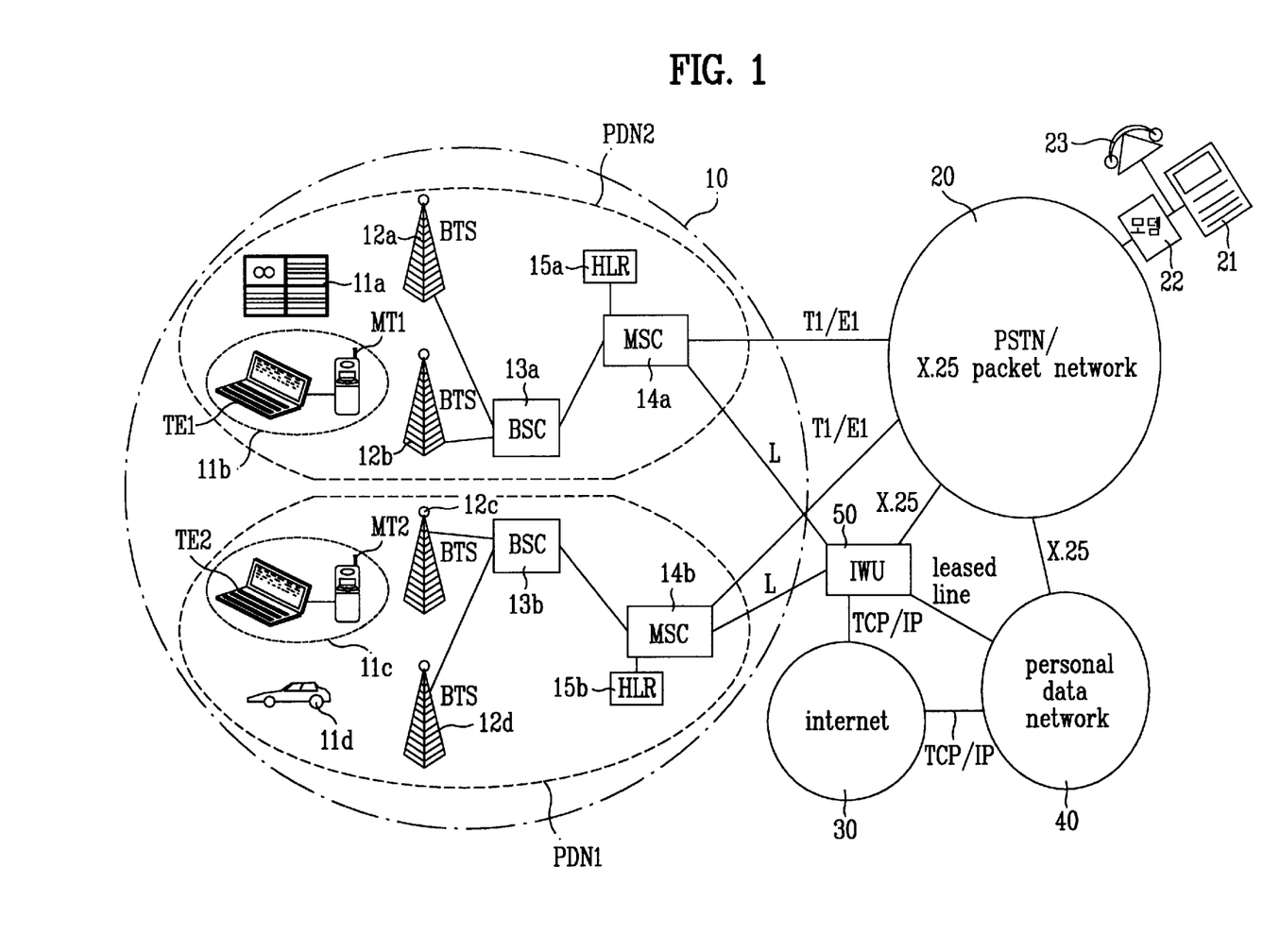
FIG. 1 illustrates a configuration of a related art wire/wireless data communication network inclusive of an IWU in a mobile communication system.

FIG. 1 illustrates a configuration of a related art wire/wireless data communication network including an IWU.

Referring to FIG. 1, the related art wire/wireless data communication network is provided with a plurality of mobile data terminals (or mobile hosts) 11(11A–11D) each having a mobile terminal MT1 or MT2 connected to a data terminal TE1 or TE2, such as a lap top, a palm top, or a minicomputer, a plurality of BTS's (Base Stations) 12a–12d for relaying communication between the mobile data terminals 11, a plurality of BSC's (Base Station Controllers) 13a and 13b for controlling an overall management of the BTS's 12a–12d, a wireless data communication network 10 having a plurality of MSC's (Mobile Switching Centers) 14 for providing a contact point of a user traffic in making a communication between two mobile data terminals in mobile communication networks of its own or other than its own, a wire data communication network 20 having a plurality of wire data terminals such as computers each with a wire telephone 23 connected thereto through a modem 22, an internet network 30, a personal data network 40, and an IWU 50 for interconnecting the networks 10, 20, 30, and 40.

Figure 2:
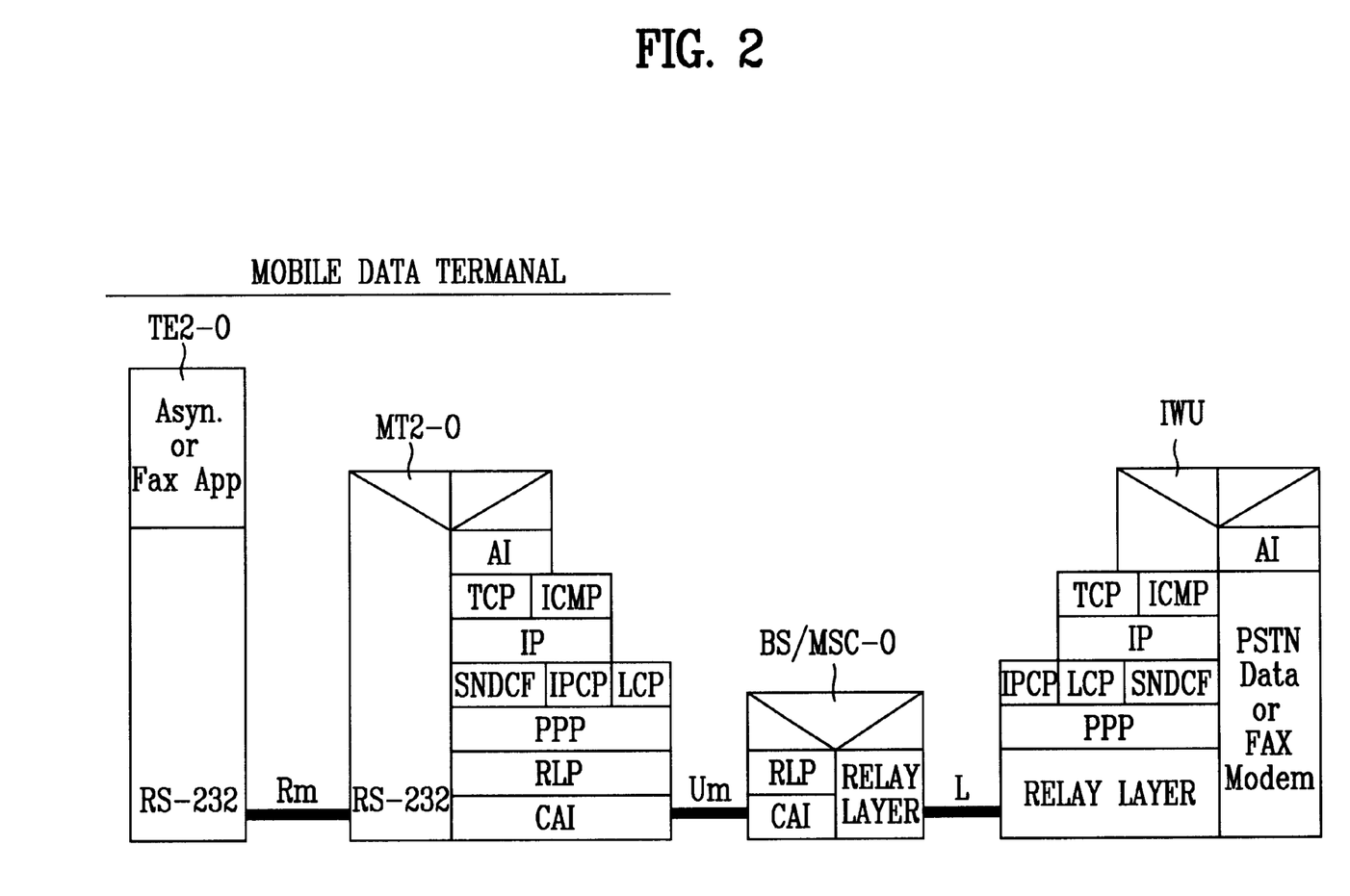
FIG. 2 illustrate an architecture showing a related art circuit data service communication protocol in a mobile communication system of a CDMA system given in IS-99 and IS-707 recommendations.
Figure 3:
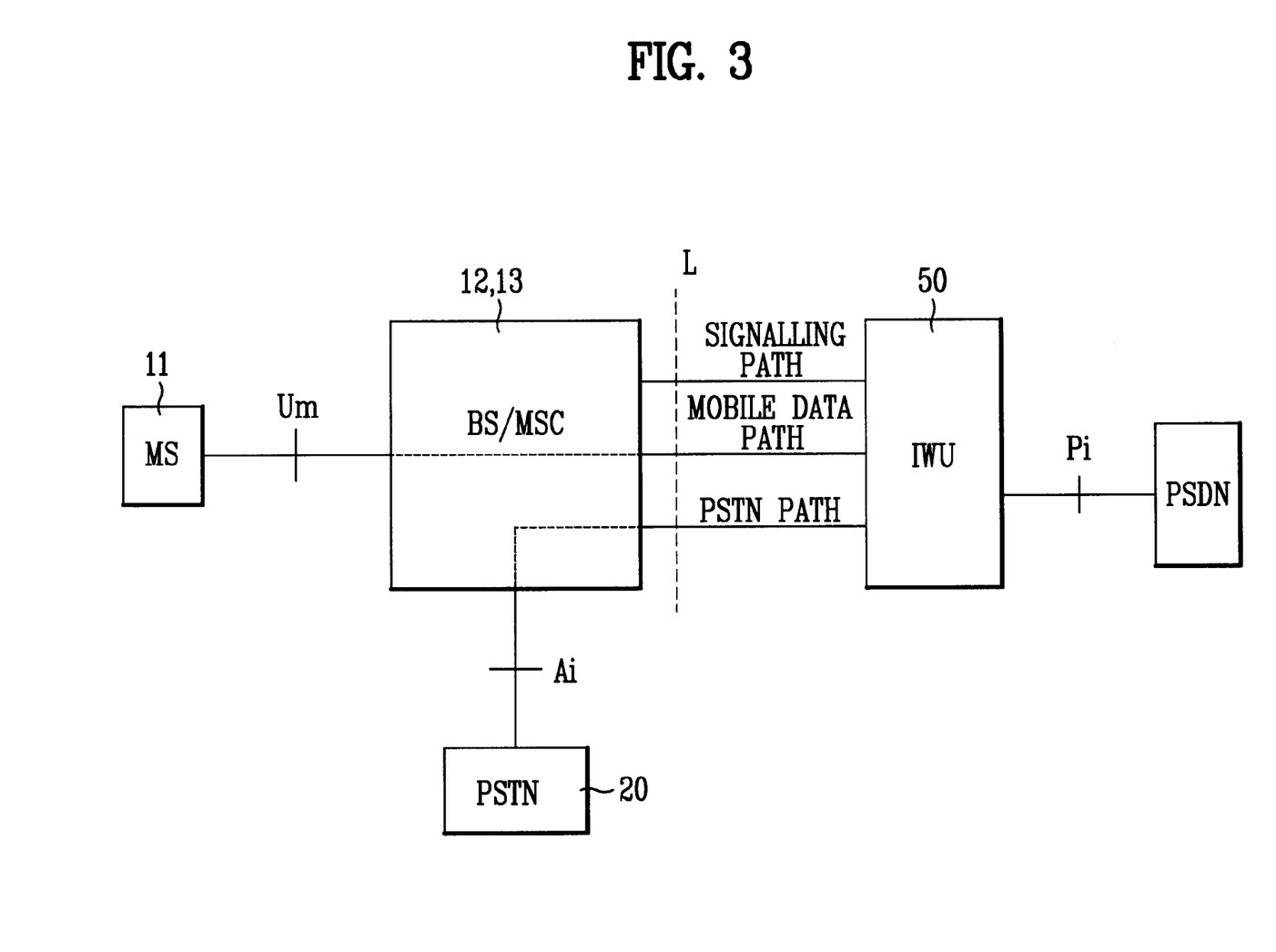
FIG. 3 illustrates a wireless data communication network system for explaining a wireless data communication method in a related art mobile communication system.

A related art method for making a data communication between a mobile data terminal 11c wireless connected to a wireless data communication network 10 and a wire data terminal(the computer 21 connected with the wire telephone 23 connected to the wire data communication network 20 will be explained with reference to FIGS. 3–4. FIG. 2 illustrate an architecture showing a circuit data service communication protocol in a mobile communication system given in IS-99 and IS-707 recommendations. What is shown in FIG. 2 is a communication protocol only on a transmission side with reference to the IWU, while omitting a receiver side as the receiver side communication protocol architecture is symmetry with respect to the IWU. This communication protocol architecture is mostly used in a wireless circuit data service. First, under a condition that one mobile data terminal 11c is provided by connecting a transmission side data terminal TE2 and a mobile terminal MT2 both in the wireless data communication network 10, a user makes a communication with an AI (application interface) layer in the mobile terminal MT2 using an AT instruction word through a screen given on a data terminal TE2, to set up a data communication mode of the mobile data terminal 10c and communication parameters. Then, the user calls a wire data terminal (or a wire host) in the wire data communication network 20 using an ATD originating instruction word. When the user of the mobile data terminal 11c called a counter part using the ATD originating instruction word, the originating function of the mobile terminal MT2 demands a call connection to the mobile switching center 14b through pertinent base station 12c inclusive of a data service option n required from the CAI layer in the mobile terminal MT2. Then, detecting the data service option n, the mobile switching center 14b sets up a RLP (Radio Link Protocol) for use in data link of the mobile terminal MT2 between the mobile terminal MT2 and the base station 12c for execution of the call from the mobile data terminal 11c. The mobile switching center 14b connects the data terminal TE2 to the IWU 50 through a mobile data path and a signalling path shown in FIG. 3. Once the data path between the mobile terminal MT2 and the IWU 50 is established, a data communication protocol layer is set up between the mobile terminal MT2 and the IWU 50. Accordingly, the AI layers of the mobile terminal MT2 and the IWU 50 are connected to each other to process the AID originating instruction word the user applied to the data terminal TE2 in the AI layer of the IWU 50, so that the IWU 50 calls the wire data terminal 21 connected to the PSTN through the signalling path. Then, the modem 22 connected to the IWU 50 is activated to connected a circuit to a modem of the counterpart through a PSTN path, opening a communication between the wireless data terminal TE2 and the data terminal 21 in the wire data communication network 20 and allowing a communication between both parties. On the other hand, in a case of data reception, when the wire data communication network 20 calls the mobile data terminal 11a–11d with a subscriber identification number of the mobile terminal MT1 or MT2, the mobile switching center 14b calls the mobile terminal MT2 through the base station 12a–12d. When the mobile terminal MT2 gives a response in the data service option n, the mobile switching center 14b connects the IWU 50 to a relay layer for the mobile data path and the wire data communication network 20 is connected to the IWU 50. In this instance, the base station 12 activates the RLP layer of the mobile terminal MT2 for making a both way communication of the mobile data terminal 11c and data terminal connected to the wire data network 20 the same as the case of calling signal.

However, this related art is developed mainly aimed for data communications between a data terminal and a data terminal in a wire network. Accordingly, the aforementioned related art has been applied even to a wireless data communication between data terminals. That is, in order to conduct a wireless communication between data terminals using communication standards such as IS-99 or IS-707, the IWU should set up a call for a reception terminal because a communication protocol with the IWU should be used. In this instance, one more modem in the IWU should be occupied and an additional path from the IWU to the mobile switching center should be used.

SUMMARY OF THE INVENTION

Accordingly, the present invention is directed to a method for making a mobile-to-mobile wireless data communication in PCS (Personal Communication Services)/digital cellular mobile telecommunication system that substantially obviates one or more of the problems due to limitations and disadvantages of the related art.

An object of the present invention is to provide a method for making a mobile-to-mobile wireless data communication in PCS (Personal Communication Services)/digital cellular mobile telecommunication system which allows a direct communication without occupying an IWU.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the method for making a mobile-to-mobile wireless data communication includes the steps of (1) transmitting an originating instruction for a terminating mobile data terminal as an originating mobile data terminal sets up a service mode, (2) making a communication using a first radio link protocol (RLP) set up between the originating mobile data terminal and a base station/mobile switching center, (3) calling the terminating mobile data terminal through an identification number of the originating mobile data terminal and a service option as the originating instruction is executed, (4) informing a signal responding to the call to the originating mobile data terminal, (5) making a communication using a second RLP set up between the terminating mobile data terminal and the base station/mobile switching center, (6) setting up protocol layers in succession, the protocol layers having levels higher than levels of the first, and second RLP's, and (7) executing a wireless data communication between the originating, and terminating mobile data terminals.

Though the present invention having the aforementioned features uses a basic data communication protocol the same as the related art protocol used in communication between a mobile data terminal and a data terminal in a wire data communication network as it was, a service option n operative in actual service and an operation of an AI layer in the mobile terminal are changed, and no interworking unit is involved. And, information on a state of the terminating terminal of being busy or giving no response can be transmitted quickly to the originating mobile data terminal in a form of a control signal through a signalling channel between the mobile data terminal and the base station.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENT

Reference will now be made in detail to the preferred embodiments of the present invention, examples of which are illustrated in the accompanying drawings. FIG. 4 illustrate an architecture showing a data communication protocol for conducting a wireless data communication between mobile data terminals in accordance with a preferred embodiment of the present invention, and FIG. 5 illustrates a control flow showing a wireless data communication procedure between mobile data terminals in accordance with a preferred embodiment of the present invention.

Figure 4:
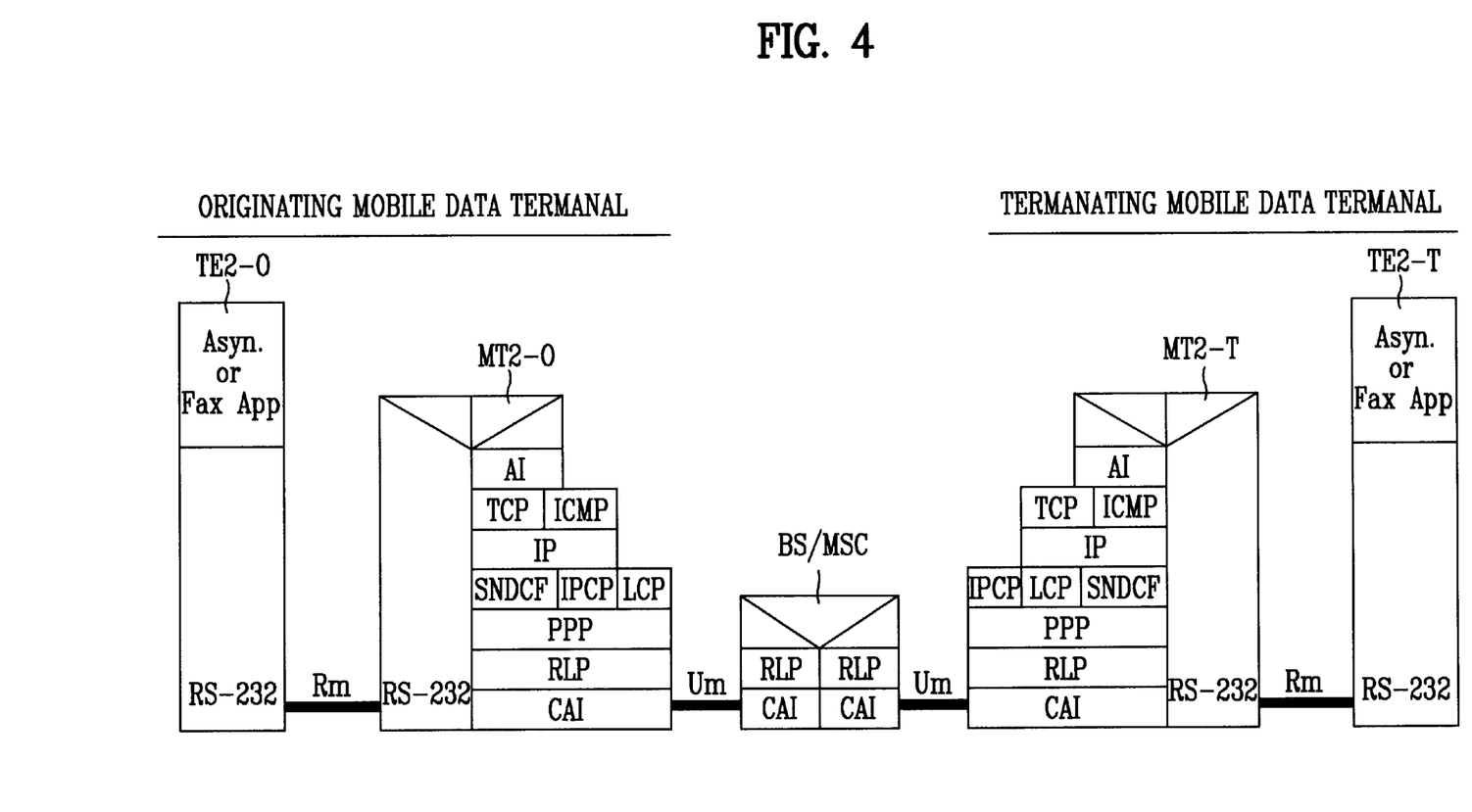
FIG. 4 illustrate an architecture showing a data communication protocol for conducting a wireless data communication between mobile data terminals in accordance with a preferred embodiment of the present invention; and, FIG. 5 illustrates a control flow showing a wireless data communication procedure between mobile data terminals in accordance with a preferred embodiment of the present invention.
Figure 5:
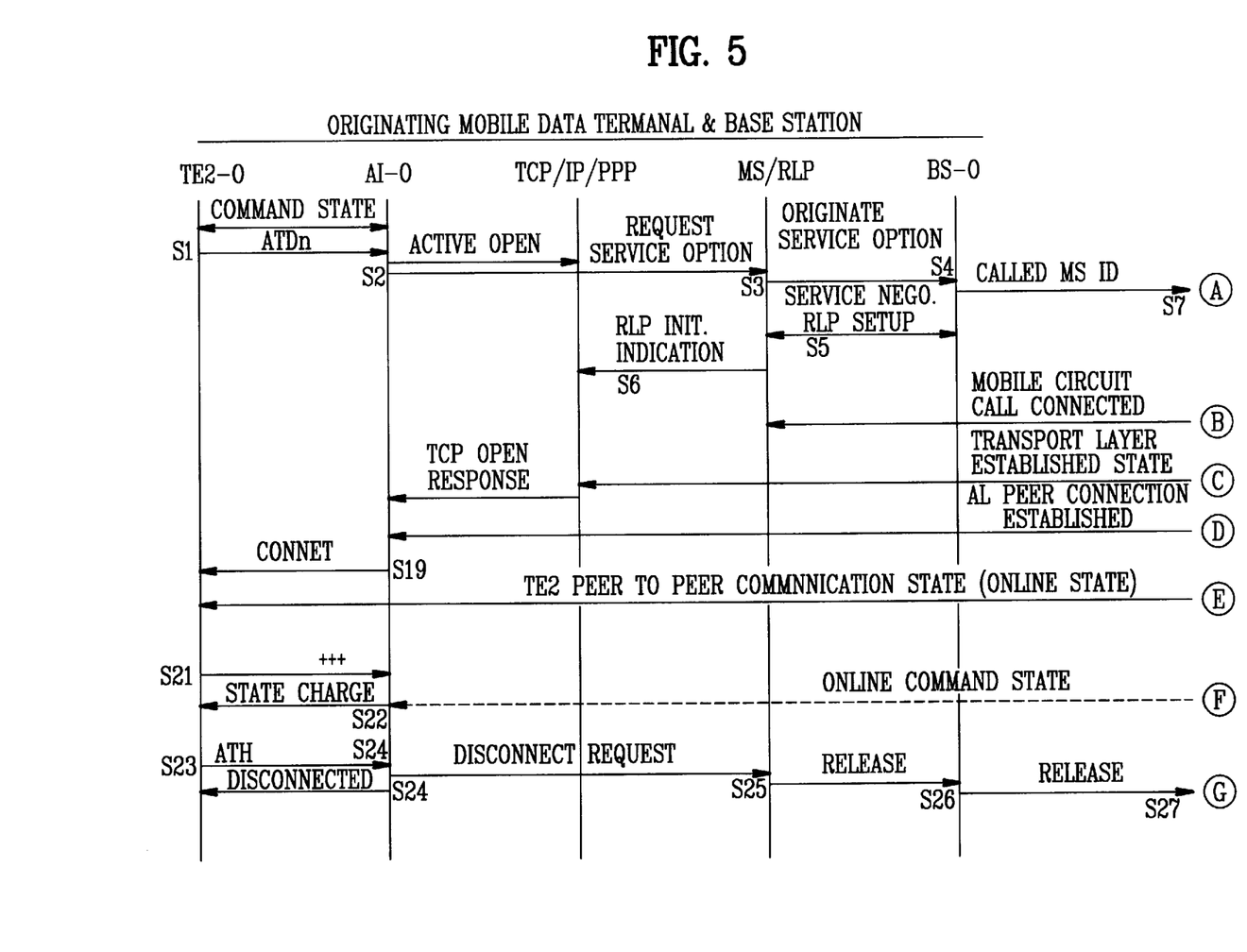
Figure 6:
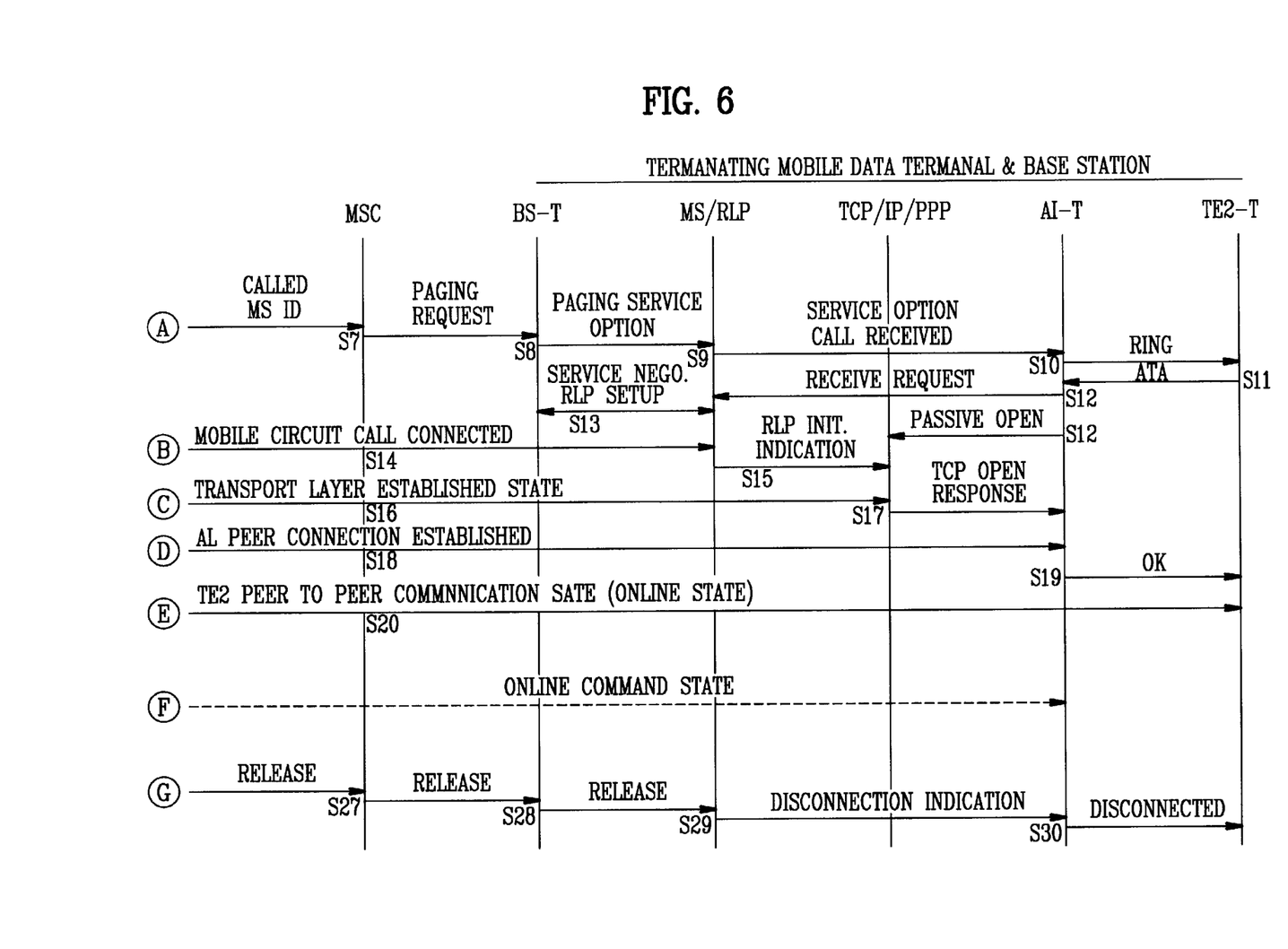

User of an originating mobile data terminal shown in FIG. 4 connects a data terminal TE2 to an originating mobile terminal MT2 through a connector of a set standard, such as RS-232. Then, the user gives an AT+CRM command to set up a mode of the mobile terminal MT2 to be a data service mode between mobile data terminals. In this instance, if a data service option between the mobile terminals is set up, the mobile terminal MT2 attempts no call connected to the base station side even when the user enters an AT noncognition instruction word. Then, when the user applies an ATD originating command (S1) from the originating mobile data terminal side using a data terminal TE2-0, the mobile terminal MT2-0 of the originating mobile data terminal demands a call connection with a circuit data service option set up between the mobile data terminals. Then, an AI layer in the originating mobile data terminal demands a TCP (Transmission Control Protocol) active open (S2). In this instance, the originating base station BS-0 transmits a receiver identification number ID and a service option n to the mobile switching center MSC (S3). Accordingly, the mobile switching center forwards a signal for calling a terminating mobile data terminal to a terminating base station BS-T (S4). The originating base station BS-O opens a RLP with the mobile terminal MT2-0 of the originating mobile data terminal (S5), and the originating mobile data terminal actuates a PPP (Internet Point to Point Protocol). The terminating side base station BS-T calls the mobile terminal MT2-T of the terminating mobile data terminal with the service option n demanded from the mobile switching center (S7). In this instance, the data terminal TE2-T of the terminating mobile data terminal either gives a response to the service option n call automatically or forwards a ring signal, preset in the data terminal TE2-T, to the user on the terminating side (S10). The user on the terminating mobile data terminal having either given a response signal automatically or forwarded a ring signal gives a response in an ATA instruction word (S11). Once the terminating mobile terminal MT2-T gives a response, a RLP is opened between the terminating side base station BS-T and the terminating mobile data terminal (S13), and an AI layer in the terminating mobile terminal MT2 demands a TCP passive open (S12). Accordingly, a communication path is opened between the mobile data terminals of the originating and terminating sides (S14), PPP is opened between both of the mobile data terminals of the originating and terminating sides, and, in continuation, a TCP is opened (S16 and S17). Upon completion of the TCP opening, a 'connect' message is displayed on the data terminal TE2-0 of the originating mobile data terminal (S19), and an 'OK' message is provided to the data terminal TE2-T of the terminating mobile data terminal as a response to the ATA, thereby executing data communication between both parties (S20). If the user on the originating mobile data terminal applies a communication end instruction word to the data terminal TE2-0 (S23), a call disconnect request is made through the AI layer in the mobile terminal MT2-0 on the originating mobile data terminal (S24). Then, the AI layer in the originating mobile terminal MT2-0 provides a "release" message to a display in the originating mobile terminal MT2-0 (S24), and instructs a disconnection to the AI layer in the terminating mobile terminal MT2-T through the originating side base station BS, the mobile switching center, and the terminating side base station in succession started from the originating mobile terminal MT2-0 in an order as shown in FIG. 5 (S25-S29). Accordingly, the AI layer in the terminating mobile terminal MT2-T causes to display a disconnect state on the data terminal TE2-T of the originating mobile data terminal (S30). In this instance, when the terminating mobile data terminal is busy or gives no response though the originating mobile data terminal have originated a call signal, the mobile switching center informs the present state of the terminating mobile data terminal to the originating mobile data terminal in an audible sound and, on the same time, the base station informs a state of the terminating mobile terminal MT2-T to the mobile terminal MT2 of the originating mobile data terminal using a signal channel, and the AI layer in the originating mobile terminal MT2-0 received the state informs the present state of the terminating side to the originating data terminal TE2 in an AT instruction word response form.

TABLE 1 and TABLE 2 below illustrates an embodiment of different instruction words required for a data communication between data terminals, which are instruction words which should be changed from the instruction words used in an existing data communication to a wire network data terminal without fail. Though instruction words not given in this embodiment should be the existing instruction words in IS-99 standard, because a remote modem function in response and the instruction words of the IS-99 and IS-707 are not used by the IWU, the remote modem function is not used.

Since a wireless data communication between mobile data terminals in personal communication services/digital cellular mobile telecommunication system is made possible without the IWU, the present invention can provide a simple communication path than the related art, with a high communication service. And, because no IWU is involved in a communication of a mobile data terminal, a communication load on an entire wireless data communication network can be reduced.

It will be apparent to those skilled in the art that various modifications and variations can be made in the method for making a mobile-to-mobile wireless data communication of the present invention without departing from the spirit or scope of the invention. Thus, it is intended that the present invention cover the modifications and variations of this invention provided they come within the scope of the appended claims and their equivalents.

TABLE 1

Basic AT parameters and S-registers

| Para. & Reg. | Descriptions |
| --- | --- |
| E0, E1 | Do not echo command(E0), echo command(E1) |
| Q0, Q1 | Return result codes(Q0), do not return result codes(Q1) |
| V0, V1 | Display result codes as number(V0) or word(V1) |
| Z0 | Reset to default configuration |
| &C0, &C1 | Circuits 109 always ON(&C0), or ON when OMS and TMS are connected as ESTABLISHED STATE |
| &D0, &D2 | Ignore circuit 108/2(&D0), or enter command state following ON to OFF of circuit 108/2 |
| &Fn | Set to factory defined configuration |
| S0 = 0 to FF | Enable auto answering after (value-1) × 6 second. |
| S3, S4, S5 | S3 = 13 CR character, S4 = 10 LF character, S5 = 8 BS character |
| S7 = 1 to FF | Number of second to establish end - to - end data connection, enter ESTABLISHED state |

TABLE 2

AT action command and result codes

| | |
| --- | --- |
| A/ | Re-execute previous command |
| A | Enter the online state, receiving incoming call |
| D<dial string> | Cause the MT2 to transition from command state to online state, the dial string in mandatory and does not contain any dial modifier |
| H0, O0 | Cause the MT2 to transition from online command state to command state(H0), to online state(O0) |
| +++ | Cause the MT2 to transition from online state to online command state |
| OK | AT processing action OK |
| connect[rate] | rate is optional, it can be 8 kbps or 13.3 kbps |
| RING<SO#> | SO# call receiving |
| BUSY | When TMS is busy |
| No Answer | When S7 is over |
| Error | AT command action error |

What is claimed is:

1. A method for making a mobile-to-mobile wireless data communication, comprising:

(1) transmitting an originating instruction for a terminating mobile data terminal as an originating mobile data terminal sets up a service mode;

(2) making a communication using a first radio link protocol (RLP) set up between the originating mobile data terminal and a first base station/mobile switching center;

(3) calling the terminating mobile data terminal using an identification number and a service option from the originating mobile data terminal as the originating instruction is executed;

(4) transmitting a signal responding to the call to the originating mobile data terminal;

(5) making a communication using a second RLP set up between the terminating mobile data terminal and a second base station/mobile switching center;

(6) setting up protocol layers in succession, the protocol layers having levels higher than levels of the first and second RLP's; and (7) executing a wireless data communication between the originating and terminating mobile data terminals, wherein the wireless data communication is performed without using an interworking function.

2. The method as claimed in claim 1, wherein a transmission path of a signal for calling the terminating mobile data terminal is in an order of the originating mobile data terminal, terminating side base station, a mobile switching center, an originating side base station, and terminating mobile data terminal.

3. The method as claimed in claim 1, wherein step (4) comprises:
   one of making a response to a call of the service option automatically and transmitting a preset ring signal to a user on a terminating side; and
   the user on the terminating side making a response using the terminating mobile data terminal.

4. The method as claimed in claim 1, wherein the protocol layers step (6) comprise a PPP (Internet Point to Point Protocol), a TCP (Transmission Control Protocol), and an AI (Application Protocol).

5. The method as claimed in claim 1, wherein, if the terminating mobile data terminal is busy or gives no response in step (3), the mobile switching center informs a present state of the terminating mobile terminal to the originating mobile terminal, and, at the same time, the originating base station makes a response of a state of the terminating mobile data terminal in an instruction word to the originating mobile terminal.

6. The method as claimed in claim 5, wherein the mobile switching center uses an audible tone to indicate the present state of the terminating mobile terminal.

7. The method as claimed in claim 1, wherein the first and second base station/mobile switching centers are not the same base station/mobile switching center.

8. The method as claimed in claim 1, wherein the first base station/mobile switching center communicates with the second base station/mobile switching center through a Public Switched Telephone Network.

9. A method for establishing wireless data communication, comprising:
   establishing communication between an originating mobile data terminal and a first base station/mobile switching center using a first protocol;
   requesting communication to a terminating mobile data terminal through a second base station/mobile switching center using an identification number of the terminating mobile data terminal;
   establishing communication using the first protocol between the terminating mobile data terminal and a second base station/mobile switching center; and
   setting up protocol layers in succession, the protocol layers having levels higher than a level of the first protocol to establish data communication between the first and second mobile data terminals wherein the data communication is established without using an interworking function.

10. The method of claim 9, wherein the first base station/mobile switching center is distinct from the second base station/mobile switching center.

11. The method of claim 9, wherein the first protocol is a Radio Link Protocol (RLP).

12. The method of claim 11, wherein the communication is carried out using a common air interface (CAI).

13. The method of claim 9, wherein the successively set up protocol layers are chosen from among Point-to-Point Protocol (PPP), Transmission Control Protocol (TCP), Application Interface (AI), and Internet Protocol (IP).

14. The method of claim 9, wherein the step of requesting communication to a terminating mobile data terminal is carried out using a paging channel.

15. The method of claim 9, wherein the first base station/mobile switching center communicates with the second base station/mobile switching center through a Public Switched Telephone Network (PSTN).

16. The method of claim 9, wherein the first base station/mobile switching center communicates with the second base station/mobile switching center through an Integrated Services Digital Network (ISDN).

17. A method for performing wireless data communication, comprising:
   establishing communication between a first mobile terminal and a first base station/mobile switching center;
   establishing communication between a second mobile terminal and a second base station/mobile switching center;
   performing data communications between the first mobile terminal and the second mobile terminal through the first and second base station/mobile switching center without using interworking function.

18. The method of claim 17, wherein the communication between the first mobile terminal and the first base station/mobile switching center uses a first interface and first protocol, and wherein the communication between the second mobile terminal and the second base station/mobile switching center uses the first interface and the first protocol.

19. The method of claim 18, when the first interface comprises a $U_m$ interface, and wherein the first protocol comprises a Radio Link Protocol.

20. The method of claim 18, further comprising setting up protocol layers in succession, the protocol layers having levels higher than a levels of the first protocol.

21. The method of claim 20, wherein the first protocol comprises a RLP (Radio Link Protocol), and wherein the successive protocols comprise a PPP (Internet Point to Point Protocol), a TCP (Transmission Control Protocol), and an AI (Application Protocol).

22. The method of claim 17, further comprising setting up the originating mobile terminal for data service.

23. The method of claim 17, wherein each of the first and second mobile terminals for coupled to a corresponding data terminal using a second protocol and a second interface.

24. The method of claim 17, wherein a mobile circuit connection is established between a first mobile terminal and the second mobile terminal to perform the data communication.

25. The method of claim 24, wherein a transport layer is established after the mobile circuit call is connected, and wherein a peer connection is established after the transport layer is established.

26. The method of claim 17, wherein the first base station/mobile switching center and the second base station/mobile switching center are not the same base station/mobile switching center.

* * * * *